United States Patent
Peng et al.

(10) Patent No.: US 10,333,261 B2
(45) Date of Patent: Jun. 25, 2019

(54) USB SIGNAL SWITCHING CIRCUIT, USB DATA LINE, USB SIGNAL SWITCHING METHOD AND STORAGE MEDIUM

(71) Applicant: OnePlus Technology (Shenzhen) Co., Ltd., Shenzhen, Guangdong (CN)

(72) Inventors: Liangcai Peng, Shenzhen (CN); Kewei Wu, Shenzhen (CN)

(73) Assignee: ONEPLUS TECHNOLOGY (SHENZHEN) CO., LTD., Shenzhen (CN)

( * ) Notice: Subject to any disclaimer, the term of this patent is extended or adjusted under 35 U.S.C. 154(b) by 95 days.

(21) Appl. No.: 15/528,533

(22) PCT Filed: Jul. 14, 2015

(86) PCT No.: PCT/CN2015/084012
§ 371 (c)(1),
(2) Date: Aug. 11, 2017

(87) PCT Pub. No.: WO2016/078433
PCT Pub. Date: May 26, 2016

(65) Prior Publication Data
US 2017/0358891 A1   Dec. 14, 2017

(30) Foreign Application Priority Data
Nov. 20, 2014   (CN) .......................... 2014 1 0670435

(51) Int. Cl.
| | |
|---|---|
| *H01R 13/66* | (2006.01) |
| *G06F 13/42* | (2006.01) |
| *H01R 13/04* | (2006.01) |
| *H01R 13/70* | (2006.01) |

(52) U.S. Cl.
CPC ..... *H01R 13/6691* (2013.01); *G06F 13/4282* (2013.01); *H01R 13/04* (2013.01);
(Continued)

(58) Field of Classification Search
None
See application file for complete search history.

(56) References Cited

U.S. PATENT DOCUMENTS

| 6,086,430 A * | 7/2000 | Amoni ................ H01R 13/645 439/639 |
| 7,174,408 B2 * | 2/2007 | Ede ..................... G06F 13/4081 710/105 |

(Continued)

FOREIGN PATENT DOCUMENTS

| CN | 201038524 Y | 3/2008 |
| CN | 201122770 Y | 9/2008 |

(Continued)

OTHER PUBLICATIONS

International Search Report in international application No. PCT/CN2015/084012, dated Sep. 30, 2015.

(Continued)

*Primary Examiner* — Henry Tsai
*Assistant Examiner* — Aurangzeb Hassan
(74) *Attorney, Agent, or Firm* — Syncoda LLC; Feng Ma (57) ABSTRACT

A USB signal switching circuit and method, and a storage medium, which are applicable to a USB data line with a first USB plug and a second USB plug. Both front and back surfaces of an insulation tongue piece in the first USB plug are provided with functional pins. The USB signal switching circuit comprises a signal switching module and two switching switch modules connected to the signal switching module. Two functional pins Vbus in the first USB plug are respectively connected to a functional pin Vbus on the second USB plug via the switching switch module. Functional pins D+ and D− in the first USB plug are connected to a functional pin D+ and a functional pin D− on the second USB plug via the signal switching module respectively.

12 Claims, 6 Drawing Sheets

(52) U.S. Cl.
CPC ......... *H01R 13/6616* (2013.01); *H01R 13/70* (2013.01); *G06F 2213/0042* (2013.01)

(56) References Cited

U.S. PATENT DOCUMENTS

| | | | |
|---|---|---|---|
| 2007/0005840 A1* | 1/2007 | Cheng | G06F 1/1632 710/62 |
| 2010/0057946 A1* | 3/2010 | Crumlin | H01R 13/7039 710/16 |
| 2012/0184120 A1* | 7/2012 | Basta | A61B 5/746 439/213 |
| 2014/0206209 A1 | 7/2014 | Kamei et al. | |
| 2014/0235095 A1 | 8/2014 | Jones et al. | |
| 2014/0329416 A1* | 11/2014 | Golko | H01R 29/00 439/676 |
| 2014/0335709 A1* | 11/2014 | Chung | H01R 31/06 439/172 |
| 2015/0169491 A1* | 6/2015 | Chen | G06F 13/4068 710/33 |

FOREIGN PATENT DOCUMENTS

| | | |
|---|---|---|
| CN | 102324637 A | 1/2012 |
| CN | 102340069 A | 2/2012 |
| CN | 202159799 U | 3/2012 |
| CN | 202695772 U | 1/2013 |
| CN | 103178405 A | 6/2013 |
| CN | 202976848 U | 6/2013 |
| CN | 103187642 A | 7/2013 |
| CN | 103199362 A | 7/2013 |
| CN | 103368018 A | 10/2013 |
| CN | 103947056 A | 7/2014 |
| CN | 104408007 A | 3/2015 |

OTHER PUBLICATIONS

English Translation of the Written Opinion of the International Search Authority in international application No. PCT/CN2015/084012, dated Sep. 30, 2015.

* cited by examiner

USB SIGNAL SWITCHING CIRCUIT, USB DATA LINE, USB SIGNAL SWITCHING METHOD AND STORAGE MEDIUM

TECHNICAL FIELD

The disclosure relates to the field of Universal Serial Bus (USB) applications, and in particular, to a USB signal switching circuit, a USB data line, a USB signal switching method and a storage medium.

BACKGROUND

Figure 1:
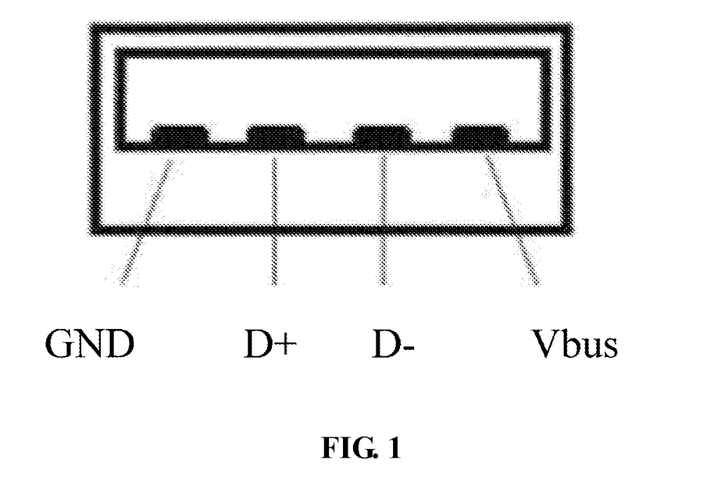
FIG. 1 is a schematic view showing a structure of a provided USB plug.

USB is an abbreviation for Universal Serial Bus, which is a kind of external bus standard, for standardizing connection and communication between a computer and a peripheral device. A USB data line is used for the connection and communication between the computer and the peripheral device (e.g., mobile phone), for example, for data transmission and battery charging. At present, the USB plug, which is connected to a computer side, of the USB data line available on the market, typically has a structure as shown in FIG. 1. The USB plug is provided with metal contacts (that is, functional pins for implementing USB signal transmission) on a single side only. Therefore, the USB plug with such structure may be only inserted, in a single orientation, into a USB socket on a computer side. Thus, users often need to check the orientation of the plug before inserting the plug, or need to try several times to insert the plug correctly. The usage of the USB plug with such structure is troublesome, and inconvenience is brought to users.

In order to solve problems such as inconvenient usage existing in the USB plug with such structure which can be only inserted in a single orientation, an improvement is made to the USB plug with such orientation and a double-sided USB plug is provided. In the USB plug with such structure, both front and back sides of an insulative tongue are provided with metal contacts. However, in practical application, even though both front and back sides of the USB plug are provided with metal contacts and electrical connections can be established between the metal contacts and the USB socket, the double-sided USB plug structure sometimes operates abnormally.

SUMMARY

The embodiment of the disclosure is intended to provide a USB signal switching circuit, a USB data line, a USB signal switching method and a storage medium which can guarantee the normal operation and convenient plugging/unplugging of a USB plug.

The embodiment of the disclosure is realized by the following technical solution.

The first aspect of the embodiment of the disclosure provides a USB signal switching circuit, which is applied to a USB data line that has a first USB plug and a second USB plug. Either of front and back sides of an insulative tongue in the first USB plug is provided with a group of functional pins that is capable of implementing standard USB signal transmission independently. The USB signal switching circuit includes a signal switching module and two switching modules connected to the signal switching module. Functional pins Vbus on the front and back sides of the insulative tongue in the first USB plug are connected to a functional pin Vbus on the second USB plug via the respective switching modules. Functional pins D+ and D− on the front and back sides of the insulative tongue in the first USB plug are connected to functional pins D+ and D− on the second USB plug via the signal switching module respectively.

Based on the above solution, the signal switching module includes a signal switching chip U1, and a functional pin VCC of the signal switching chip U1 is connected to the functional pin Vbus on the second USB plug via a resistor R1. A functional pin S of the signal switching chip U1 is connected to the functional pin Vbus on the second USB plug via the switching module. Functional pins D+ and D− of the signal switching chip U1 are connected to the functional pins D+ and D− on the second USB plug respectively. Functional pins HSD1+ and HSD1− of the signal switching chip U1 are connected to the functional pins D+ and D− on the front side of the insulative tongue in the first USB plug respectively. Functional pins HSD2+ and HSD2− of the signal switching chip U1 are connected to the functional pins D+ and D− on the back side of the insulative tongue in the first USB plug respectively.

Based on the above scheme, the switching module is a diode. An anode of the diode is connected to the functional pin Vbus of the insulative tongue in the first USB plug and a cathode of the diode is connected to the functional pin Vbus on the second USB plug.

Based on the above solution, the switching module includes an MOS transistor Q1 and a driving chip U2. The gate G of the MOS transistor Q1 is connected to the functional pin GATE of the driving chip, the drain D of the MOS transistor Q1 is connected to a functional pin VIN of the driving chip U2 and as a signal input terminal of the switching module, is connected to the functional pin Vbus on the insulative tongue in the first USB plug. The source S of the MOS transistor Q1 is connected to a functional pin SENSE of the driving chip U2 and as a signal output terminal of the switching module, is connected to the functional pin Vbus on the second USB plug.

Based on the above solution, a diode is connected in series between the functional pin Vbus on the second USB plug and the resistor R1. The anode of the diode is connected to the functional pin Vbus on the second USB plug, and the cathode of the diode is connected to the resistor R1.

The second aspect of the embodiment of the disclosure provides a USB data line, including a first USB plug, a second USB plug and a connection line connected between the first USB plug and the second USB plug. Either of the front and back sides of the insulative tongue in the first USB plug is provided with a group of functional pins that is capable of implementing standard USB signal transmission independently. The USB data line further includes the USB signal switching circuit described above.

The third aspect of the embodiment of the disclosure provides a USB signal switching method, which is applied to a circuit that has a first USB plug and a second USB plug. Either of the front and back sides of the insulative tongue in the first USB plug is provided with a group of functional pins that is capable of implementing standard USB signal transmission independently, the method further includes the following steps.

When the functional pins on the front side of the insulative tongue in the first USB plug are connected to a USB socket, the functional pin Vbus on the front side of the insulative tongue in the first USB plug and the functional pin Vbus on the second USB plug are conducted, the functional pin D+ on the front side of the insulative tongue in the first USB plug and the functional pin D+ on the second USB plug are conducted, and the functional pin D− on the front side of the insulative tongue in the first USB plug and the functional pin D− on the second USB plug are conducted.

When the functional pins on the back side of the insulative tongue in the first USB plug are connected to a USB socket, the functional pin Vbus on the back side of the insulative tongue in the first USB plug and the functional pin Vbus on the second USB plug are conducted, the functional pin D+ on the back side of the insulative tongue in the first USB plug and the functional pin D+ on the second USB plug are conducted, and the functional pin D− on the back side of the insulative tongue in the first USB plug and the functional pin D− on the second USB plug are conducted.

The fourth aspect of the embodiment of the disclosure provides a computer storage medium having stored therein computer executable instructions for executing the method described above.

The USB signal switching circuit, USB data line, USB signal switching method and storage medium provided by the embodiment of the disclosure disconnect the conduction of metal contacts on one side while making the other side of the double-sided USB plug electrically connected with a USB socket through USB signal switching, so as to avoid the problem of abnormal operation of the USB plug caused when the metal contacts on the one side are in contact with conductive materials such as other metals of the USB socket. In addition, the USB signal switching circuit and the USB data line have characteristics of simple circuit structure, high operation efficiency and high performance. The USB data line can carry out both data transmission and battery charging normally no matter the front side or back side of the USB plug of the USB data line is inserted into a computer side USB socket, such that a significant convenience is brought to the usage of users and user experiences are efficiently improved.

DETAILED DESCRIPTION

In order to be better understood by those skilled in the art, the disclosure is described below in further detail in conjunction with accompanying drawings. It is to be understood that preferred embodiments described below are merely to illustrate and describe the disclosure but to limit the disclosure.

Figure 2:
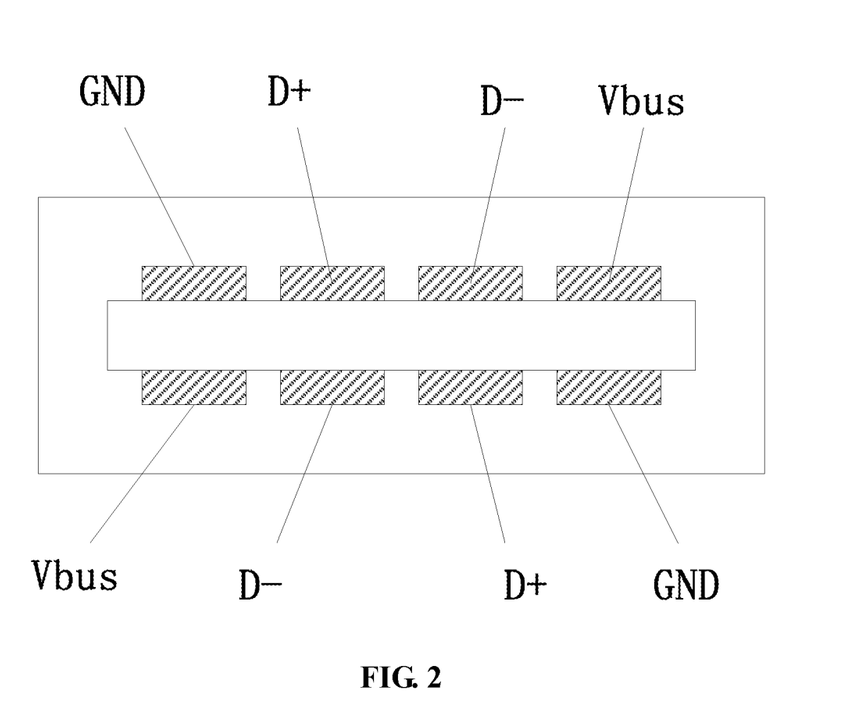
FIG. 2 is a schematic view showing a structure of another provided USB plug in which both sides of an insulative tongue are provided with metal contacts.

In order to solve the problem existing in conventional USB plug structures that users need to pay attention to the inserting orientation when using the USB plug, a double-sided USB plug is provided as shown in FIG. 2. Both front and back sides of an insulative tongue of the double-sided USB plug are provided with metal contacts. That is, either of front and back sides of the insulative tongue is provided with a group of metal contacts that is capable of implementing standard USB signal transmission independently. Moreover, the functional pins of a group of metal contacts are arranged in a sequence opposite to the sequence of the functional pins of the other group of metal contacts. Since both front and back sides of the insulative tongue of such USB plug structure are provided with metal contacts, the USB plug may be inserted into a USB socket on a computer side, irrespective of the front or back side. However, due to the functional pins arranged on the front and back sides, when the metal contacts on the front or back side of the double-sided USB plug are in contact with the contacts on the USB socket, the metal contacts on the other side might be in contact with conductive materials, such as the metal shell of the USB socket, leading to abnormal operation of the USB plug. In view of this, the embodiment of the disclosure provides a USB signal switching circuit, a USB data line and a USB signal switching method, which can realize the suspending in air of the metal contacts on a first side by disabling the metal contacts on the first side to form a conducting circuit, while making the metal contacts on a second side of the USB plug electrically connected with a USB socket through USB signal switching, so as to avoid the abnormal operation of the double-sided USB plug.

The USB signal switching circuit is applied to a USB data line. The USB data line has a first USB plug and a second USB plug. Either of the front and back sides of the insulative tongue in the first USB plug is provided with a group of functional pins that is capable of implementing standard USB signal transmission independently. The USB signal switching circuit includes a signal switching module and two switching modules connected to the signal switching module. The functional pins Vbus on the front and back sides of the insulative tongue in the first USB plug are connected to a functional pin Vbus on the second USB plug via the respective switching module. The functional pins D+ and D− on the front and back sides of the insulative tongue in the first USB plug are connected to functional pins D+ and D− on the second USB plug via the signal switching module respectively. The schematic view showing a structure of the first USB plug is shown in FIG. 2. Here, the functional pin Vbus is a functional pin for a charging source signal, the functional pin D+ is a functional pin for a data anode, the functional pin D− is a functional pin for a data cathode, and the functional pin GND is a functional pin for power ground. The second USB plug may be a standard USB plug which is adapted to and connected to a peripheral mobile device such as mobile phone, digital camera or MP4, which will not be described in detailed here. In a conclusion, the USB signal switching circuit described in the embodiment can selectively make the functional pins on the front or back side of the insulative tongue of the first USB plug connected with the functional pins on the second USB plug.

For better understanding and convenient description, in the embodiment of the disclosure, unless otherwise specified, the first USB plug refers to a USB plug connected to a USB socket on a computer side, hereinafter called a USB plug on the computer side, and the second USB plug refers to a USB plug that may be connected to a peripheral mobile device such as mobile phone, digital camera or MP4, hereinafter called a USB plug on the mobile phone side.

The operation process of the embodiment of the disclosure is described below briefly in conjunction with FIG. 3. When the front side of the USB plug on the computer side is inserted into a computer USB socket, the switching module 1 is conducted, so that the Vbus on the front side of the USB plug on the computer side is connected with the Vbus on the USB plug on the mobile phone side, Meanwhile, the signal switching module conducts the channel 1 and channel 3, the switching module 2 is cut off, so that the functional pins on the front side of the USB plug on the computer side are connected with the data signal and power of the USB plug on the mobile phone side, realizing data interaction between the computer side and the mobile phone side, battery charging and so on. Otherwise, when the back side of the USB plug on the computer side is inserted into the computer USB socket, the switching module 2 is conducted, so that the Vbus on the back side of the USB plug on the computer side is connected with the Vbus on the USB plug on the mobile phone side. Meanwhile, the signal switching module conducts the channel 2 and channel 3, the switching module 1 is cut off, so that the functional pins on the back side of the USB plug on the computer side are connected with the data signal and power of the USB plug on the mobile phone side, realizing data interaction between the computer side and the mobile phone side, battery charging and so on.

The disclosure will be described below in further detail through specific embodiments.

First Embodiment

Figure 4:
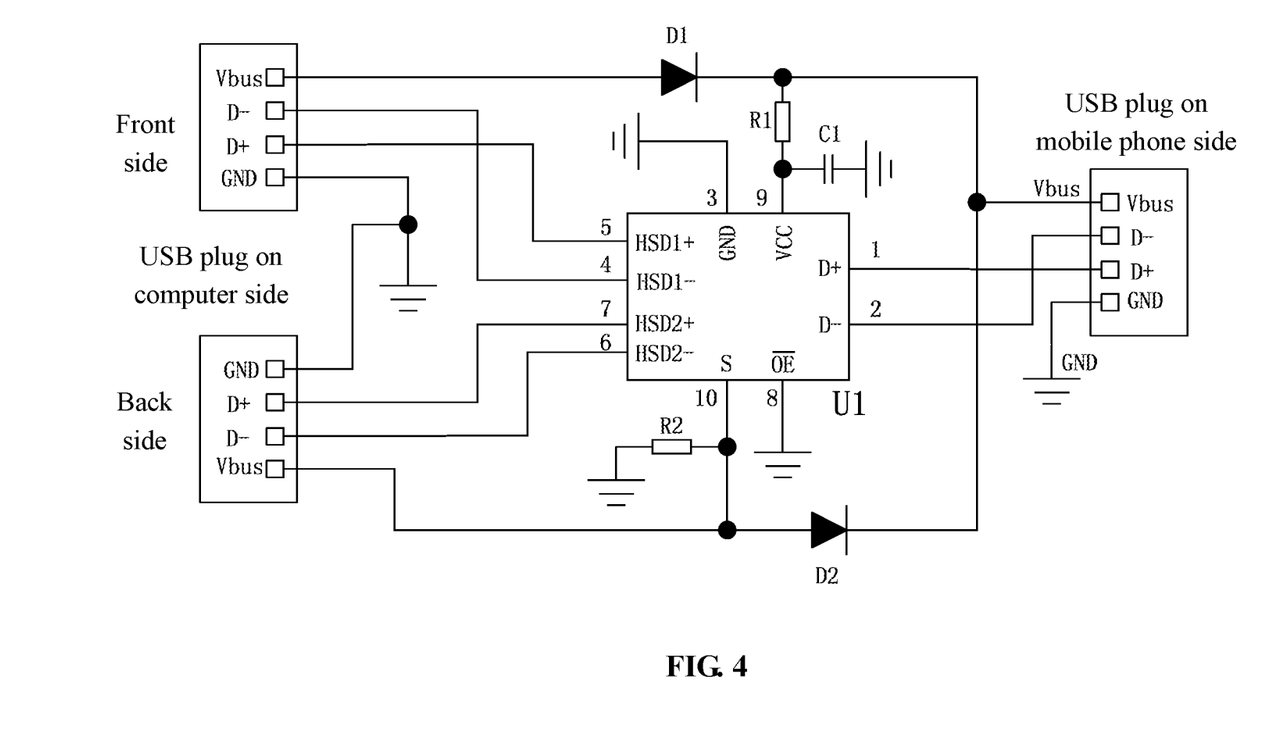
FIG. 4 is a schematic circuit diagram of a USB signal switching circuit in a first embodiment of the disclosure.

In this embodiment, the signal switching module includes a signal switching chip U1, resistors R1 and R2, and a capacitor C1. The switching modules are diodes D1 and D2 respectively. Here, the model of the signal switching chip U1 preferably is NLAS7242MUTBG. As shown in FIG. 4, the functional pin Vbus on the front side of the USB plug on the computer side is connected to the anode of the diode D1, and the cathode of the diode D1 is connected to the functional pin Vbus on the USB plug on the mobile phone side. The functional pin Vbus on the back side of the USB plug on the computer side is connected to the anode of the diode D2, and the cathode of the diode D2 is connected to the functional pin Vbus on the USB plug on the mobile phone side. The functional pin VCC of the signal switching chip U1 is connected to the functional pin Vbus on the USB plug on the mobile phone side through via the resistor R1. The functional pin S of the signal switching chip U1 is connected to the functional pin Vbus on the USB plug on the mobile phone side via the diode D2, and the functional pin S of the signal switching chip U1 is connected to the functional pin Vbus on the back side of the USB plug on the computer side. The functional pins D+ and D− of the signal switching chip U1 are connected to the functional pins D+ and D− on the USB plug on the mobile phone side respectively. The functional pins HSD1+ and HSD1− of the signal switching chip U1 are connected to the functional pins D+ and D− on the front side of the USB plug on the computer side respectively, and functional pins HSD2+ and HSD2− of the signal switching chip U1 are connected to the functional pins D+ and D− on the back side of the USB plug on the computer side respectively. Both functional pins GND and OE of the signal switching chip U1 are grounded. In addition, the functional pin S of the signal switching chip U1 is also grounded via the resistor R2 and the functional pin VCC of the signal switching chip U1 is also grounded via the capacitor C1, so that the operation performance of the USB signal switching circuit is more stable and more reliable. Of course, the connection relations of the two groups of functional pins on the USB plug on the computer side may be exchanged. For example, the functional pin Vbus on the front side of the USB plug on the computer side is connected to the functional pin S of the signal switching chip U1, and is connected to the functional pin Vbus of the USB plug on the mobile phone side via the diode D2, while the functional pin Vbus on the back side of the USB plug on the computer side is connected to the functional pin Vbus on the USB plug on the mobile phone side via the diode D1 and is connected to the functional pin VCC of the signal switching chip U1 via the resistor R1.

Here, the logic level signals of the functional pins of the signal switching chip U1 are as shown in the following table:

| $\overline{OE}$ | S | HSD1+, HSD1− | HSD2+, HSD2− |
|---|---|---|---|
| 0 | 0 | ON | OFF |
| 0 | 1 | OFF | ON |
| 1 | x | OFF | OFF |

When the front side of the USB plug on the computer side is inserted into the computer USB socket, due to the characteristic of forward-conduction and reverse-cut-off of diodes, the diode D1 is conducted and the diode D2 is cut off. Therefore, the functional pin S end of the signal switching chip U1 is of low level. Thus, the functional pins HSD1+ and HSD1− of the signal switching chip U1 are connected with the functional pins D+ and D− respectively, so that the signal transmission between the functional pins on the front side of the USB plug on the computer side and the USB plug on the mobile phone side may be realized. Similarly, when the back side of the USB plug on the computer side is inserted into the computer USB socket, the diode D2 is conducted and the diode D1 is cut off. Therefore, the functional pin S end of the signal switching chip U1 is of high level. Thus, the functional pins HSD2+ and HSD2− of the signal switching chip U1 are connected with the functional pins D+ and D− respectively, so that the signal transmission between the functional pins on the back side of the USB plug on the computer side and the USB plug on the mobile phone side may be realized.

Second Embodiment

Figure 5:
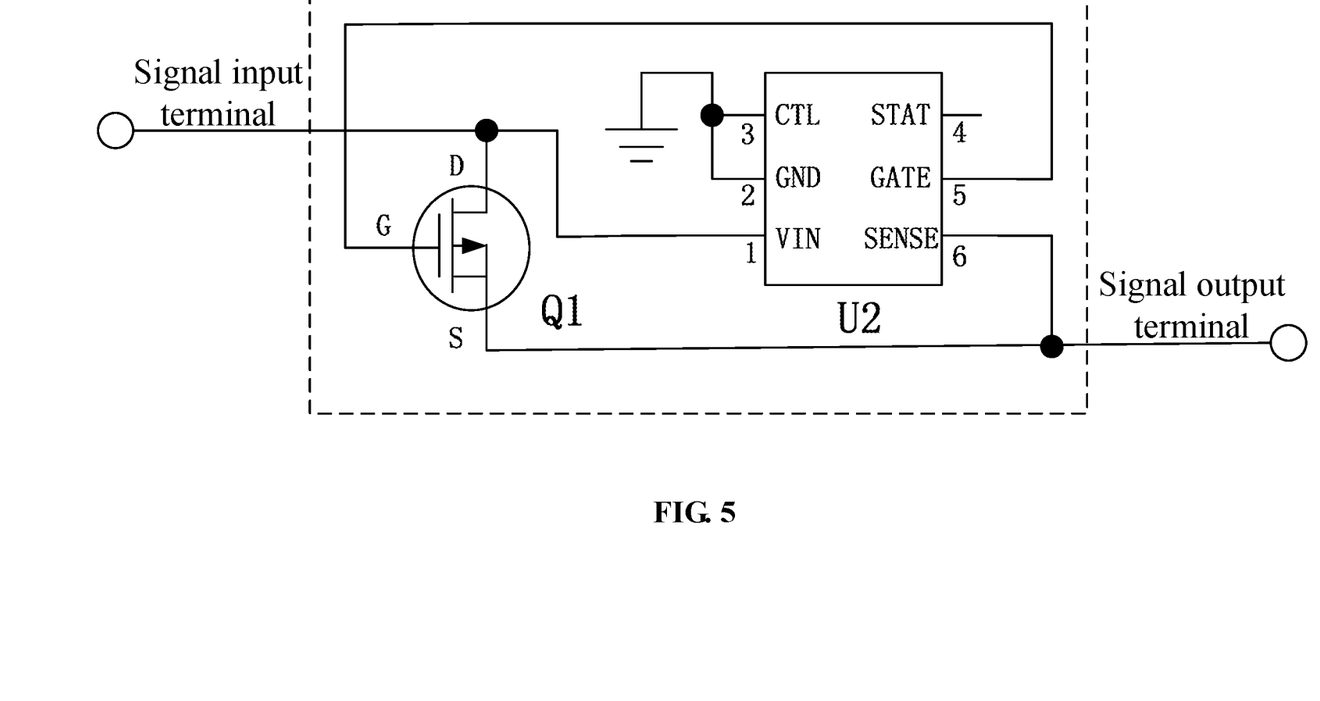
FIG. 5 is a schematic circuit diagram of a switching module in a second embodiment of the disclosure.

In this embodiment, a switching module, which includes an MOS transistor Q1 and a driving chip U2, is used, instead of the switching module composed of the diode D1 or D2 mentioned in the first embodiment. Here, the model of the driving chip U2 preferably is LTC4412. The MOS transistor Q1 is a P-channel MOS transistor, for example, a MOS transistor with model of NTLUS3A18PZTAG. As shown in FIG. 5, the gate G of the MOS transistor Q1 is connected to a functional pin GATE of the driving chip. The drain D of the MOS transistor Q1 is connected to a functional pin VIN of the driving chip U2 and serves as a signal input terminal of the switching module, and the source S of the MOS transistor Q1 is connected to a functional pin SENSE of the driving chip U2 and serves as a signal output terminal of the switching module. Both functional pins CTL and GND of the driving chip U2 are grounded, and the functional pin STAT is suspended. When the voltage at the terminal Vin of the driving chip U2 is greater than the voltage at the terminal SENSE, the MOS transistor Q1 is conducted. When the voltage at the terminal Vin of the driving chip U2 is less than the voltage at the terminal SENSE, the MOS transistor Q1 is cut off. Therefore, the switching module which includes the MOS transistor Q1 and the driving chip U2 in the present embodiment has basically similar functions as the switching module, which includes the diode D1 or D2 mentioned in the Embodiment 1.

Figure 6:
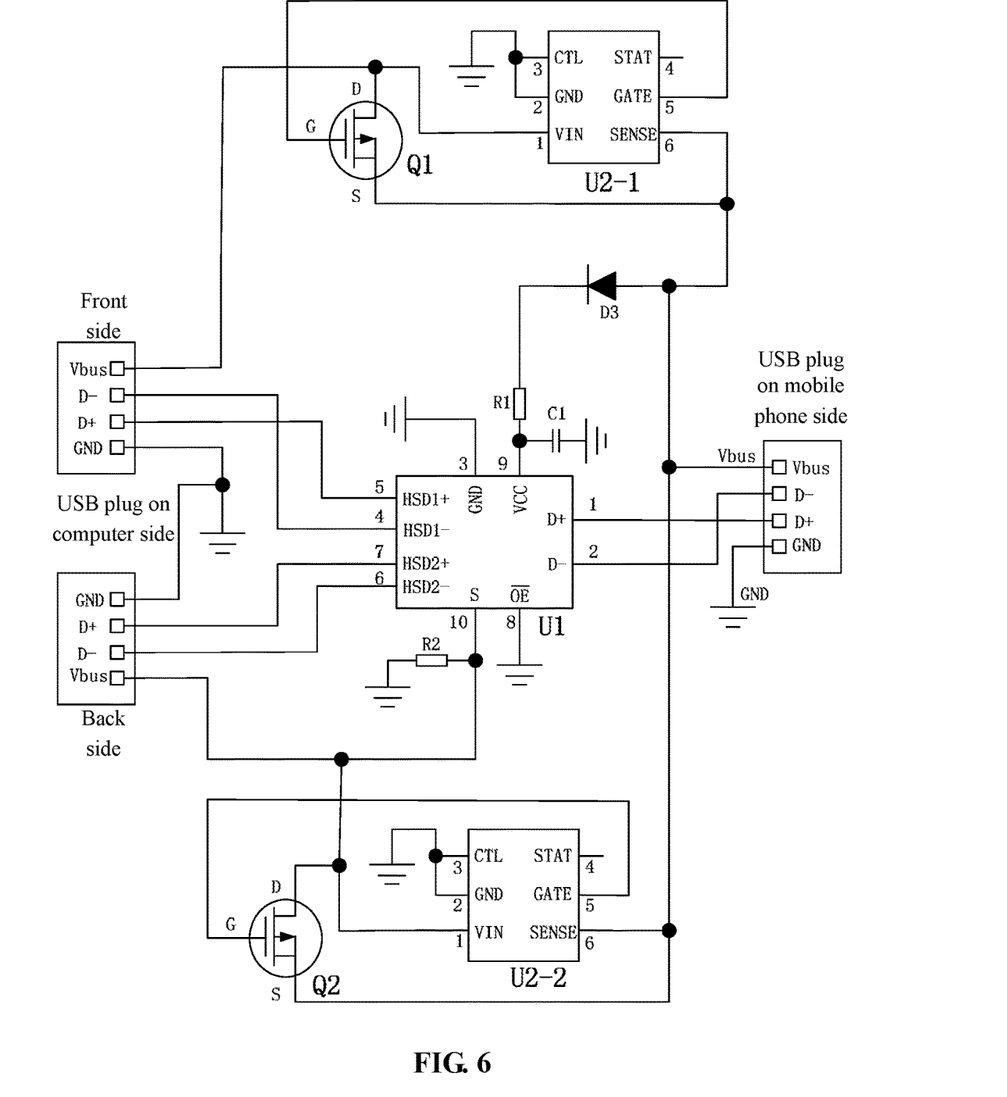
FIG. 6 is a schematic circuit diagram of a USB signal switching circuit in the second embodiment of the disclosure.

As shown in FIG. 6, in the present embodiment, the signal input terminal of the switching module is connected to the functional pin Vbus on the insulative tongue in the USB plug on the computer side, while the signal output terminal of the switching module is connected to the functional pin Vbus on the USB plug on the mobile phone side. The present embodiment differs from the first embodiment only in that the switching module is different, and the connection relations of other components are the same, which will not be described in detail here. The operation process or principle is substantially the same as that of the first embodiment, and will not be described in detail here.

In this embodiment, the switching module, which includes the MOS transistor Q1 and the driving chip U2 is used, instead of the switching module, which includes the diode mentioned in the first embodiment. As such, defects of diodes such as big voltage drop and high temperature rise are overcome, and advantages such as long service life and less self heating are achieved.

In addition, in order to better protect the signal switching chip U1, a diode D3 may be added on the basis of this embodiment. As shown in FIG. 6, the anode of the diode D3 is connected to the functional pin Vbus on the USB plug on the mobile phone side and the cathode of the diode D3 is connected to the resistor R1.

Third Embodiment

This embodiment provides a USB data line. The USB data line includes a first USB plug, a second USB plug and a connection line connected between the first USB plug and the second USB plug. Either of front and back sides of an insulative tongue in the first USB plug is provided with a group of functional pins that is capable of implementing standard USB signal transmission independently. The USB data line further includes the USB signal switching circuit described in the first or second embodiment.

The USB data line provided by the embodiment may carry out both data transmission and battery charging normally, no matter the front side or back side of the first USB plug which is in contact with and connected to the computer side is inserted into the computer side USB socket. As such, a significant convenience is brought to the usage of users and user experiences are efficiently improved.

The embodiment of the disclosure further provides a USB signal switching method, which is applied to a circuit that has a first USB plug and a second USB plug. Either of the front and back sides of the insulative tongue in the first USB plug is provided with a group of functional pins that is capable of implementing standard USB signal transmission independently.

The method includes the following steps.

When the functional pins on the front side of the insulative tongue in the first USB plug are connected to a USB socket, the functional pin Vbus on the front side of the insulative tongue in the first USB plug and the functional pin Vbus on the second USB plug are conducted, the functional pin D+ on the front side of the insulative tongue in the first USB plug and the functional pin D+ on the second USB plug are conducted, and the functional pin D− on the front side of the insulative tongue in the first USB plug and the functional pin D− on the second USB plug are conducted.

When the functional pins on the back side of the insulative tongue in the first USB plug are connected to a USB socket, the functional pin Vbus on the back side of the insulative tongue in the first USB plug and the functional pin Vbus on the second USB plug are conducted, the functional pin D+ on the back side of the insulative tongue in the first USB plug and the functional pin D+ on the second USB plug are conducted, and the functional pin D− on the back side of the insulative tongue in the first USB plug and the functional pin D− on the second USB plug are conducted.

For the USB signal switching mentioned in the present embodiment, even though the functional pins of the USB plug and the USB socket are connected reversely, correct transmission of USB signals also can be guaranteed. Thus, the normal operation of the USB plug can be guaranteed. Since either the front-side or the back-side of the USB plug can be inserted into the USB socket, users have no need to consider the sides of the USB plug before inserting the USB plug. Thus, user operations are simplified and user experiences are improved.

Figure 3:
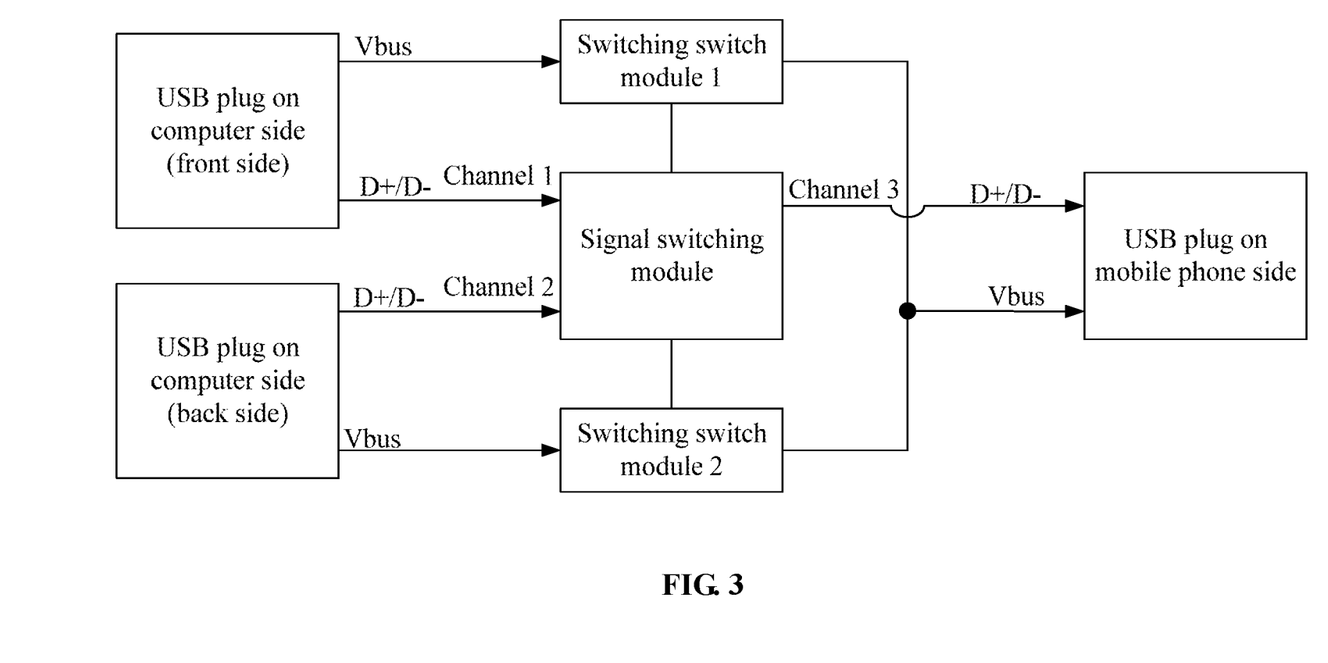
FIG. 3 is a principle block diagram of a USB signal switching circuit provided by the embodiment of the disclosure.

The method described in this embodiment may be applied to the circuit structure shown in FIG. 3 to FIG. 5. Of course, the method described in the present embodiment also may be applied to equivalent structures of the circuit structure shown in FIG. 3 to FIG. 5. For example, the switching module 1 and the switching module 2 shown in FIG. 3 may be replaced by a single-pole double-throw switching module. The single-pole double-throw switching module may include a single-pole double-throw switch, which can conduct only one electrical connection path each time, but can switch between two electrical connection paths. The single-pole double-throw switching module may be used for the connection between the Vbus on the front side of the USB plug on the computer side and the Vbus of the USB plug on the mobile phone side, and the connection between the Vbus on the back side of the USB plug on the computer side and the Vbus of the mobile phone USB plug, and only one connection can be conducted one time.

For example, in the structure shown in FIG. 4, the diodes D1 and D2 may be replaced by a bidirectional anti-parallel valve to realize the function of USB signal switching realized by the circuit shown in FIG. 5.

The method provided by the present embodiment well solves the problem that the USB signal cannot be normally transmitted during the usage of the double-sided USB plug.

The embodiment of the disclosure further provides a computer storage medium having stored therein computer executable instructions for executing the method described above.

The storage medium may be various types of storage mediums such as a read-only memory (ROM)/random access memory (RAM), magnetic disk, compact disc or USB flash disk. The computer storage medium described by the present embodiment may is non-instantaneous storage medium.

The content mentioned in the above embodiment is preferred implementations of the disclosure, but a limit to the disclosure. Any modification made according to the principle of the disclosure is intended to be included in the scope of protection of the disclosure.

What is claimed is:

1. A Universal Serial Bus (USB) signal switching circuit, which is applied to a USB data line that has a first USB plug and a second USB plug, either of front and back sides of an insulative tongue in the first USB plug being provided with a group of functional pins that is capable of implementing standard USB signal transmission independently, wherein the USB signal switching circuit comprises a signal switching module and two switching modules connected to the signal switching module; functional pins Vbus on the front and back sides of the insulative tongue in the first USB plug are connected to a functional pin Vbus on the second USB plug via the respective switching modules; and functional pins D+ and D− on the front and back sides of the insulative tongue in the first USB plug are connected to functional pins D+ and D− on the second USB plug via the signal switching module respectively, wherein the signal switching module comprises a signal switching chip U1, and a functional pin VCC of the signal switching chip U1 is connected to the functional pin Vbus on the second USB plug through a resistor R1;

a functional pin S of the signal switching chip U1 is connected to the functional pin Vbus on the second USB plug through the switching module;

functional pins D+ and D− of the signal switching chip U1 are connected to the functional pins D+ and D− on the second USB plug respectively;

functional pins HSD1+ and HSD1− of the signal switching chip U1 are connected to the functional pins D+ and D− on the front side of the insulative tongue in the first USB plug respectively; and functional pins HSD2+ and HSD2− of the signal switching chip U1 are connected to the functional pins D+ and D− on the back side of the insulative tongue in the first USB plug respectively.

2. The USB signal switching circuit according to claim 1, wherein
either of the switching modules is a diode;
an anode of the diode is connected to the functional pin Vbus of the insulative tongue in the first USB plug; and
a cathode of the diode is connected to the functional pin Vbus on the second USB plug.

3. The USB signal switching circuit according to claim 1, wherein the switching module comprises an MOS transistor Q1 and a driving chip U2, an electrode G of the MOS transistor Q1 is connected to a functional pin GATE of the driving chip, an electrode D of the MOS transistor Q1 is connected to a functional pin VIN of the driving chip U2 and as a signal input terminal of the switching module, is connected to the functional pin Vbus on the insulative tongue in the first USB plug, and an electrode S of the MOS transistor Q1 is connected to a functional pin SENSE of the driving chip U2 and as a signal output terminal of the switching module, is connected to the functional pin Vbus on the second USB plug.

4. The USB signal switching circuit according to claim 3, wherein a diode is connected in series between the functional pin Vbus on the second USB plug and the resistor R1, an anode of the diode is connected to the functional pin Vbus on the second USB plug, and a cathode of the diode is connected to the resistor R1.

5. The USB signal switching circuit according to claim 3, wherein the MOS transistor Q1 is a P-channel MOS transistor.

6. A USB data line, comprising a first USB plug, a second USB plug and a connection line connected between the first USB plug and the second USB plug, wherein
either of front and back sides of an insulative tongue in the first USB plug is provided with a group of functional pins that is capable of implementing standard USB signal transmission independently, and the USB data line further comprises a USB signal switching circuit, and the USB signal switching circuit comprises a signal switching module and two switching modules connected to the signal switching module; functional pins Vbus on the front and back sides of the insulative tongue in the first USB plug are connected to a functional pin Vbus on the second USB plug via the respective switching modules; and
functional pins D+ and D− on the front and back sides of the insulative tongue in the first USB plug are connected to functional pins D+ and D− on the second USB plug via the signal switching module respectively;

wherein the signal switching module comprises a signal switching chip U1, and a functional pin VCC of the signal switching chip U1 is connected to the functional pin Vbus on the second USB plug through a resistor R1;

a functional pin S of the signal switching chip U1 is connected to the functional pin Vbus on the second USB plug through the switching module;

functional pins D+ and D− of the signal switching chip U1 are connected to the functional pins D+ and D− on the second USB plug respectively;

functional pins HSD1+ and HSD1− of the signal switching chip U1 are connected to the functional pins D+ and D− on the front side of the insulative tongue in the first USB plug respectively; and functional pins HSD2+ and HSD2− of the signal switching chip U1 are connected to the functional pins D+ and D− on the back side of the insulative tongue in the first USB plug respectively.

7. A USB signal switching method, which is applied to a circuit that has a first USB plug and a second USB plug, either of front and back sides of an insulative tongue in the first USB plug being provided with a group of functional pins that is capable of implementing standard USB signal transmission independently, the circuit comprises a signal switching module and two switching modules connected to the signal switching module; functional pins Vbus on the front and back sides of the insulative tongue in the first USB plug are connected to a functional pin Vbus on the second USB plug via the respective switching modules; and functional pins D+ and D− on the front and back sides of the insulative tongue in the first USB plug are connected to functional pins D+ and D− on the second USB plug via the signal switching module respectively;

the method comprising:
when the functional pins on the front side of the insulative tongue in the first USB plug are connected to a USB socket, conducting, by the signal switching module, the functional pin Vbus on the front side of the insulative tongue in the first USB plug and the functional pin Vbus on the second USB plug, conducting, by the signal switching module, the functional pin D+ on the front side of the insulative tongue in the first USB plug and the functional pin D+ on the second USB plug, and conducting, by the signal switching module, the functional pin D− on the front side of the insulative tongue in the first USB plug and the functional pin D− on the second USB plug;

when the functional pins on the back side of the insulative tongue in the first USB plug are connected to a USB socket, conducting, by the signal switching module, the functional pin Vbus on the back side of the insulative tongue in the first USB plug and the functional pin Vbus on the second USB plug, conducting, by the signal switching module, the functional pin D+ on the back side of the insulative tongue in the first USB plug and the functional pin D+ on the second USB plug, and, by the signal switching module, conducting the functional pin D− on the back side of the insulative tongue in the first USB plug and the functional pin D− on the second USB plug wherein the signal switching module comprises a signal switching chip U1, and a functional pin VCC of the signal switching chip U1 is connected to the functional pin Vbus on the second USB plug through a resistor R1;

a functional pin S of the signal switching chip U1 is connected to the functional pin Vbus on the second USB plug through the switching module;

functional pins D+ and D− of the signal switching chip U1 are connected to the functional pins D+ and D− on the second USB plug respectively;

functional pins HSD1+ and HSD1− of the signal switching chip U1 are connected to the functional pins D+ and D− on the front side of the insulative tongue in the first USB plug respectively; and functional pins HSD2+ and HSD2− of the signal switching chip U1 are connected to the functional pins D+ and D− on the back side of the insulative tongue in the first USB plug respectively.

8. A non-transitory computer storage medium having stored therein computer executable instructions for executing the method according to claim 7.

9. The USB data line according to claim 6, wherein either of the switching modules is a diode;

an anode of the diode is connected to the functional pin Vbus of the insulative tongue in the first USB plug; and a cathode of the diode is connected to the functional pin Vbus on the second USB plug.

10. The USB data line according to claim 6, wherein the switching module comprises an MOS transistor Q1 and a driving chip U2, an electrode G of the MOS transistor Q1 is connected to a functional pin GATE of the driving chip, an electrode D of the MOS transistor Q1 is connected to a functional pin VIN of the driving chip U2 and as a signal input terminal of the switching module, is connected to the functional pin Vbus on the insulative tongue in the first USB plug, and an electrode S of the MOS transistor Q1 is connected to a functional pin SENSE of the driving chip U2 and as a signal output terminal of the switching module, is connected to the functional pin Vbus on the second USB plug.

11. The USB data line according to claim 10, wherein a diode is connected in series between the functional pin Vbus on the second USB plug and the resistor R1, an anode of the diode is connected to the functional pin Vbus on the second USB plug, and a cathode of the diode is connected to the resistor R1.

12. The USB data line according to claim 10, wherein the MOS transistor Q1 is a P-channel MOS transistor.

\* \* \* \* \*